United States Patent

Kawazura et al.

[11] Patent Number: 5,098,946
[45] Date of Patent: Mar. 24, 1992

[54] PROMOTOR FOR BONDING BETWEEN RUBBER AND STEEL CORD, AND RUBBER COMPOSITION AND RUBBER PRODUCT CONTAINING THE BONDING PROMOTOR

[75] Inventors: Tetsuji Kawazura, Ninomiyamachi; Kazuyoshi Kayama, Yokohama; Yoshihisa Ogihara, Sawara; Fumiaki Yoneyama, Kamisumachi, all of Japan

[73] Assignees: The Yokohama Rubber Co., Ltd.; Dainippon Ink and Chemicals, Incorporated, both of Tokyo, Japan

[21] Appl. No.: 630,633

[22] Filed: Dec. 20, 1990

[30] Foreign Application Priority Data

Dec. 22, 1989 [JP] Japan ................................ 1-331179

[51] Int. Cl.⁵ ............................................. C08K 5/09
[52] U.S. Cl. ............................................. 524/398
[58] Field of Search .................... 524/435, 398; 556/7, 556/147

[56] References Cited

U.S. PATENT DOCUMENTS 4,609,499   9/1986   Esashi et al. ........................ 556/7

Primary Examiner—Paul R. Michl
Assistant Examiner—Yong S. Lee
Attorney, Agent, or Firm—Armstrong, Nikaido, Marmelstein, Kubovcik & Murray

[57] ABSTRACT

A promoter for bonding between a rubber and a steel cord, which is represented by the following general formula (I):

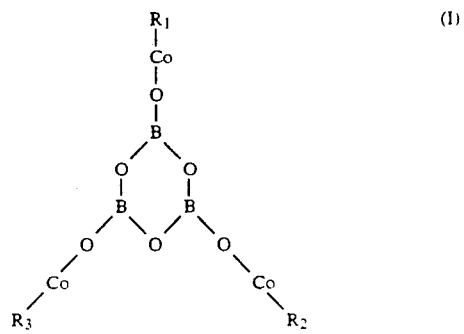

wherein $R_1$, $R_2$ and $R_3$ may be the same or different from one another and each represents a monocarboxylic radical bonded to the adjacent Co atom through the oxygen atom which is adjacent to the carbonyl group in said monocarboxylic radical; a rubber composition containing the bonding promoter, and rubber products made from the rubber composition.

19 Claims, No Drawings

PROMOTOR FOR BONDING BETWEEN RUBBER AND STEEL CORD, AND RUBBER COMPOSITION AND RUBBER PRODUCT CONTAINING THE BONDING PROMOTOR

BACKGROUND OF THE INVENTION

The present invention relates to a bonding promoter for improving the bondability of a rubber to a steel cord, and a rubber composition and rubber products containing such bonding promoter. In particular, the invention relates to a bonding promoter for reducing a lowering in the bondability of a rubber to a steel cord during the storage or use thereof at a high temperature and a high humidity.

Since steel cords have overall performances as the reinforcement far superior to those of reinforcing cords made of other fibrous materials, they are widely used as the reinforcement for rubber products such as pneumatic tires for automobiles and conveyor belts.

The steel cords to be used in the pneumatic tires and conveyor belts are plated with brass, zinc, bronze or the like in order to promote the bondability thereof to a rubber, and various plating compositions and thicknesses of the plating have been proposed. On the other hand, for the rubbers to be used for coating the steel cords, it has been proposed to incorporate thereinto a cobalt salt of an organic acid, such as cobalt naphthenate, cobalt rosinate, cobalt stearate, cobalt neodecanoate, cobalt octanoate or cobalt propionate as the bonding promoter for enhancing the bondability of the rubber to the steel cord. However, these cobalt salts of organic acids have defects that the bondability of the rubber to the steel cord is seriously impaired during the storage or use thereof at a high temperature and a high humidity, while they improve the initial bondability, and that they tend to undergo agglomeration during the storage thereof, forming agglomerates by mutual sticking.

Various bonding promoters were proposed for overcoming these defects. For example, Japanese patent application Kokai publication No. 55-17371 proposed a bonding promoter comprising a $C_7$ to $C_{11}$ carboxylic acid/boron complex which is in a non-adhesive solid form which can be converted into a fluid powder, non-agglomeration particles, tablets or flakes, if necessary. Japanese patent application Kokai publication No. 60-238326 proposed a bonding promoter comprising a reaction product of a cobalt or nickel carboxylate with an alkaline earth metal borate. However, these promoters have defects that their bondability involves a dependency on conditions of vulcanization and that their warm water-resistant bondability is lowered during vulcanization at a high temperature, though they are effective in improving the dondability of rubber to steel cords at a high temperature and a high humidity to some extent.

Japanese patent application Kokai publication No. 60-193701 proposed a borate of a monocarboxylic acid of the following general formula:

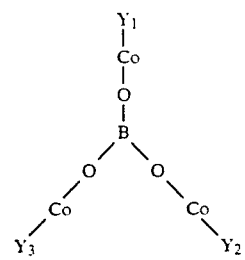

wherein $Y_1$, $Y_2$ and $Y_3$ may be the same or different from one another and each represents a resin acid radical, a naphthenic acid radical or a monocarboxylic radical having 7 to 11 carbon atoms, with the proviso that at least one of $Y_1$, $Y_2$ nd $Y_3$ represents the resin acid radical or naphthenic acid radical, as a bonding promoter for inhibiting a reduction in the bondability between steel cords used for the production of pneumatic radial tires and a rubber coating them.

However, this compound has defects that the effect of improving the bondability at a high temperature and a high humidity is insufficient, that it has a bondability dependence on conditions of vulcanization and that the warm water-resistant bondability is lowered in vulcanization at a low temperature.

SUMMARY OF THE INVENTION

An object of the present invention is to provide a promoter for bonding of a rubber to a steel cord free from the above-described defects of the conventional bonding promoters, in particular, having an excellent initial bondability, an only slight lowering in the bondability at a high temperature and a high humidity and an only low bondability dependence on conditions of vulcanization, as well as a rubber composition containing the bonding promoter and rubber products made from the composition.

The above object of the present invention can be attained with a promoter for bonding between a rubber and a steel cord represented by the following general formula (I):

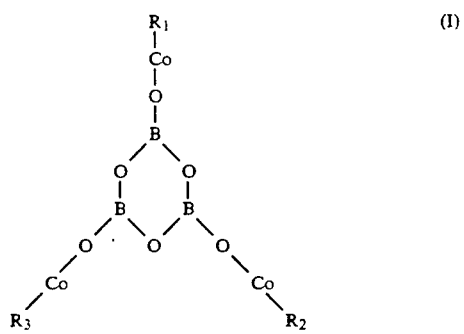

wherein $R_1$, $R_2$ and $R_3$ may be the same or different from one another and each represents a monocarboxylic radical bonded to the adjacent Co atom through the oxygen atom which is adjacent to the carbonyl group in said monocarboxylic radical.

The bonding promoter of the above general formula (I) of the present invention is a complex having a metaborate structure. In the general formula (I), $R_1$, $R_2$ and $R_3$ may be the same or different from one another and each represents a monocarboxylic radical. The monocarboxylic radicals are preferably aliphatic or alicyclic monocarboxylic radicals such as aliphatic monocarboxylic radicals having 8 to 12 carbon atoms, naphthenic acid radicals having an acid value of 100 to 340, and rosin acid radicals. The rosin acid radicals include those derived from gum rosin, wood rosin, tall rosin and disproportionated rosin and hydrofined rosin derived therefrom.

Among them, aliphatic monocarboxylic radicals having 8 to 12 carbon atoms and naphthenic acid radicals having an acid value of 100 to 340 are particularly preferred. Examples of the aliphatic monocarboxylic acids include 2-ethylhexanoic acid, Versatic acid (a product of Shell Industrial Chemical Co., Ltd.), Neodecanoic acid (a product of Exxon Chemical Co., Ltd.), lauric acid, 2,2-dimethylhexanoic acid, 4,4-dimethylhexanoic acid, 2,2,4-trimethylpentanoic acid, 3,5,5-trimethylhexanoic acid, n-decanoic acid, 2,2-dimethyloctanoic acid and n-undecanoic acid.

The bonding promoter of the general formula (I) is produced for example by reacting a monocarboxylic acid cobalt salt with a metaboric ester and removing a carboxylic ester formed as a by-product under atmospheric or reduced pressure. The monocarboxylic acid cobalt salt used herein is preferably a mixed monocarboxylic acid cobalt salt obtained from two or more monocarboxylic acids having different carbon atom numbers. Examples of the mixed monocarboxylic acid cobalt salt include a mixture of at least one of cobalt salts of a carboxylic acid selected from the group consisting of aliphatic monocarboxylic acids having 8 to 12 carbon atoms and naphthenic acids having an acid value of 100 to 340 with at least one of cobalt salts of a monocarboxylic acid selected from the group consisting of aliphatic monocarboxylic acids having 2 to 4 carbon atoms.

The metaboric ester is preferably an alkyl metaborate or aryl metaborate.

One or more bonding promoters of the present invention is or are incorporated into a rubber to form a rubber composition.

The rubber components usable for forming the rubber composition of the present invention include diene rubbers such as natural rubber, synthetic polyisoprene rubber, polybutadiene rubber, styrene/butadiene copolymer rubber, ethylene/propylene terpolymer rubber and butyl rubber. These rubber components can be used either singly or in combination of two or more of them. A rubber composition comprising the natural rubber, synthetic polyisoprene rubber or a mixture of them and the above-described bonding promoter has an excellent bondability to steel cords.

The amount of the bonding promoter to be incorporated into the rubber is 0.05 to 1.0 part by weight, preferably 0.1 to 0.3 part by weight, in terms of the cobalt element, for 100 parts by weight of the rubber. When this amount is less than 0.05 parts by weight, no sufficient bondability can be imparted to the rubber composition. On the contrary, when it exceeds 1.0 part by weight, the properties of the rubber composition are impaired by heat deterioration.

Additives usually incorporated into ordinary rubber compositions can be suitably incorporated into the rubber composition of the present invention. Examples of the additives include reinforcing agents such as carbon black, sulfur, vulcanization accelerators, vulcanization activators, antioxidants, stearic acid, process oils and zinc oxide. The composition and the amount of them are not particularly limited.

By using the compound of the general formula (I) having a metaborate structure as the bonding promoter according to the present invention, not only the initial bondability of the rubber to steel cords is improved, but also the wet heat-resistant and warm water-resistant bondabilities after vulcanization are remarkably improved and the bondability dependence on conditions of vulcanization can be reduced. Therefore, when the rubber composition of the present invention is used as a coating rubber for steel cords for reinforcing a pneumatic tire, particularly pneumatic radial tire, or a conveyor belt, rubber products having an excellent bondability between the rubber and the steel cord during the use over a long time and an excellent durability can be obtained. The reinforcing steel cords may be plated ones, preferably ones plated with brass or zinc.

EXAMPLES AND COMPARATIVE EXAMPLES

The following seven bonding promoters (compounds) A through G were synthesized.

BONDING PROMOTER A (COBALT METABORATE NAPHTHENATE)

255 g of naphthenic acid having an acid value of 220 was mixed with 93 g of cobalt hydroxide. 60 g of acetic acid was added thereto and the mixture was heated to 120° C. under stirring. 100 g of butyl metaborate was added thereto. Butyl acetate formed as a by-product was distilled off at 210° C. to obtain cobalt metaborate naphthenate which was in a purple solid form at ambient temperature. The compound had a cobalt element content of 16.1% and a boron element content of 2.8%.

BONDING PROMOTER B (COBALT METABORATE 2-ETHYLHEXANOATE)

144 g of 2-ethylhexanoic acid was mixed with 93 g of cobalt hydroxide. 25 g of propionic acid was added thereto and the mixture was heated to 120° C. Water thus formed was distilled off. The temperature was further elevated to 170° C., and 100 g of butyl metaborate was added thereto. Butyl propionate formed as a by-product was distilled off at 230° C. to obtain cobalt metaborate 2-ethylhexanoate which was in a purple solid form at ambient temperature. The compound had a cobalt element content of 23.5% and a boron element content of 4.2%.

BONDING PROMOTER C (COBALT METABORATE VERSATATE)

Cobalt metaborate Versatate was synthesized in the same manner as that for the synthesis of the Bonding promoter A described above except that 255 g of naphthenic acid was replaced with 175 g of Versatic acid (a product of Shell Industrial Chemical Co., Ltd.). This compound had a cobalt element content of 20.9% and a boron element content of 3.6 %.

BONDING PROMOTER D (COMPARATIVE EXAMPLE: COBALT ORTHOBORATE NAPHTHENATE)

255 g of naphthenic acid having an acid value of 220 was mixed with 93 g of cobalt hydroxide. 60 g of acetic acid was added thereto and the mixture was heated to 120° C. under stirring. Water thus formed was distilled off. The temperature was further elevated to 170° C. and 77 g of butyl orthoborate was added thereto. Butyl acetate formed as a by-product was distilled off at 210° C. to obtain cobalt orthoborate naphthenate, which was in a purple solid form at ambient temperature. This compound had a cobalt element content of 17.4% and a boron element content of 1.0%.

BONDING PROMOTER E (COMPARATIVE EXAMPLE: COBALT ORTHOBORATE 2-ETHYLHEXANOATE):

144 g of 2-ethylhexanoic acid was mixed with 93 g of cobalt hydroxide. 62 g of acetic acid was added thereto and the mixture was heated to 120° C. under stirring. Water thus formed was distilled off. The temperature was further elevated to 170° C. and 77 g of butyl orthoborate was added thereto. Butyl acetate formed as a by-product was distilled off at 210° C. to obtain cobalt orthoborate 2-ethylhexanoate which was in a purple solid form at ambient temperature. This compound had a cobalt element content of 26.0% and a boron element content of 1.5%.

Bonding Promoter F (Comparative Example: Cobalt Orthoborate Versatate)

Cobalt orthoborate Versatate was synthesized in the same manner as that for the synthesis of the Bonding promoter D described above except that 255 g of naphthenic acid was replaced with 175 g of Versatic acid (a product of Shell Industrial Chemical Co., Ltd.). This compound had a cobalt element content of 22.1% and a boron element content of 1.2%.

Bonding Promoter G (Cobalt Metaborate Naphthenate 2-ethylhexanoate)

Cobalt metaborate naphthenate-2-ethylhexanoate was synthetized in the same manner as that for the synthesis of the Bonding promoter A described above except that 255 g of naphthenic acid was replaced with a mixture of 72 g of 2-ethylhexanoic acid with 123 g of naphthenic acid having an acid value of 220. The resultant compound had a cobalt element content of 19.5% and a boron element content of 3.4%.

0.2 part by weight respectively of the Bonding promoters A through G for 100 parts by weight of natural rubber as the rubber component was incorporated into a rubber composition shown in the below Table 1 and the mixture was homogeneously mixed by means of a type B Banbury mixer for testing and kneading rolls for testing.

TABLE 1

| natural rubber | 100 parts by weight |
| --- | --- |
| carbon black N 326 | 45 parts by weight |
| zinc oxide | 10 parts by weight |
| antioxidant *1) | 2 parts by weight |
| sulfur (treated with 20% of oil) | 7 parts by weight |
| accelerator *2) | 0.5 parts by weight |
| Bonding promoter (in terms of Co element) *3) | 0.2 parts by weight |

*1) N-(1,3-dimethylbutyl)-N -phenyl-p-phenylenediamine
*2) N,N -dicyclohexyl-2-benzothiazolylsulfenamide
*3) The amount of Bonding promoter A was 0.15 part by weight in Example 2 and 0.30 part by weight in Example 3.

The initial bondability, the wet heat-resistant bondability after vulcanization (bondability at a high temperature and a high humidity) and the warm water-resistant bondability after the vulcanization of obtained rubber compositions to steel cords were evaluated by test methods which will be described below, and the results of the tests are given in the below Table 2.

Initial Bondability

Brass-plated steel cords having a cord structure of 3+9+15 and arranged in parallel at distances of 12.5 mm were coated with respective rubber compositions and embedded thereinto to form samples having an embedding length of 25.0 mm. The samples were vulcanized and bonded under vulcanization conditions of 160° C. for 20 min. Steel cords were pulled out and the pulling force was determined according to ASTM D-2229. The initial bondability was evaluated from the pulling force and the rubber coverage ratio (%).

Wet Heat-Resistant Bondability After Vulcanization

To examine deterioration of the bondability caused by water which had gotten to steel cords through the rubber after vulcanization, the vulcanized sample for pulling out used in the evaluation of the initial bondability was left to stand in an atmosphere at a temperature of 70° C. and a relative humidity of 96% for two weeks, and then the pulling force and the rubber coverage ratio were determined in the same manner as that in the above-described determination of the initial bondability.

Warm Water-Resistant Bondability after Vulcanization

To examine deterioration of the bondability caused by water which had gotten to steel cords through flaws, the lower end of the sample for pulling out used in the evaluation of the initial bondability was cut off, and the sample was immersed in water of 70° C. for one week, two weeks and three weeks. Then the pulling force and the rubber coverage ratio were determined in the same manner as that in the above-described determination of the initial bondability.

In the test for the warm water-resistant bondability after vulcanization, the vulcanization conditions comprised 145° C./25 min, 160° C./20 min and 170° C./15 min.

TABLE 2

| | Example | | | | | | Comparative Example | | | |
| --- | --- | --- | --- | --- | --- | --- | --- | --- | --- | --- |
| | 1 | 2 | 3 | 4 | 5 | 6 | 1 | 2 | 3 | 4 |
| Bonding Promoter: | | | | | | | | | | |
| A | 0.20 | 0.15 | 0.30 | — | — | — | — | — | — | — |
| B | — | — | — | 0.20 | — | — | — | — | — | — |
| C | — | — | — | — | 0.20 | — | — | — | — | — |
| D | — | — | — | — | — | — | 0.20 | — | — | — |
| E | — | — | — | — | — | — | — | 0.20 | — | — |
| F | — | — | — | — | — | — | — | — | 0.20 | — |
| G | — | — | — | — | — | 0.20 | — | — | — | — |
| Cobalt Naphthenate *4) | — | — | — | — | — | — | — | — | — | 0.20 |
| After vulcanization at 160° C. for 15 min: | | | | | | | | | | |
| Tensile Strength (kg/cm$^2$) | 233 | 241 | 230 | 236 | 237 | 240 | 245 | 237 | 231 | 243 |

TABLE 2-continued

|  | Example | | | | | | Comparative Example | | | |
|---|---|---|---|---|---|---|---|---|---|---|
|  | 1 | 2 | 3 | 4 | 5 | 6 | 1 | 2 | 3 | 4 |
| 100% Modulus (kg/cm²) | 33 | 32 | 38 | 34 | 34 | 35 | 36 | 39 | 38 | 38 |
| Initial Bondability | | | | | | | | | | |
| Pulling Force (kg) | 95 | 97 | 99 | 93 | 102 | 102 | 100 | 101 | 106 | 99 |
| Rubber Coverage Ratio (%) | 95 | 95 | 95 | 95 | 95 | 95 | 95 | 95 | 95 | 95 |
| Wet heat-resistant bondability after vulcanization: | | | | | | | | | | |
| Pulling Force (kg) after 2 weeks | 88 | 90 | 86 | 83 | 84 | 86 | 75 | 79 | 74 | 64 |
| Rubber Coverage Ratio (%) after 2 weeks | 90 | 90 | 90 | 88 | 91 | 90 | 83 | 87 | 82 | 77 |
| Warm water-resistant bondability after vulcanization: | | | | | | | | | | |
| vulcanization at 145° C. for 25 min | | | | | | | | | | |
| after 2 weeks: Pulling Force (kg) | 110 | 104 | 114 | 99 | 112 | 108 | 102 | 116 | 117 | 91 |
| Rubber Coverage Ratio (%) | 91 | 90 | 93 | 95 | 94 | 91 | 83 | 92 | 90 | 78 |
| after 3 weeks: Pulling Force (kg) | 107 | 109 | 100 | *5) | 102 | 104 | 90 | 108 | 100 | 82 |
| Rubber Coverage Ratio (%) | 91 | 91 | 89 | | 95 | 89 | 79 | 91 | 89 | 79 |
| vulcanization at 160° C. for 20 min | | | | | | | | | | |
| after 1 week: Pulling Force (kg) | 100 | 100 | 102 | 99 | 103 | 105 | 101 | 95 | 98 | 93 |
| Rubber Coverage Ratio (%) | 94 | 90 | 92 | 95 | 95 | 90 | 92 | 95 | 95 | 93 |
| after 2 weeks: Pulling Force (kg) | 104 | 101 | 99 | 105 | 104 | 100 | 101 | 100 | 102 | 86 |
| Rubber Coverage Ratio (%) | 95 | 94 | 95 | 95 | 95 | 90 | 90 | 94 | 92 | 86 |
| after 3 weeks: Pulling Force (kg) | 96 | 100 | 94 | 99 | 100 | 98 | 91 | 98 | 96 | 84 |
| Rubber Coverage Ratio (%) | 94 | 90 | 92 | 95 | 95 | 90 | 88 | 92 | 92 | 85 |
| vulcanization at 170° C. for 15 min | | | | | | | | | | |
| after 1 week Pulling Force (kg) | 99 | 97 | 96 | 102 | 93 | 98 | 95 | 88 | 93 | 90 |
| Rubber Coverage Ratio (%) | 95 | 95 | 95 | 95 | 95 | 95 | 92 | 91 | 93 | 95 |
| after 2 weeks Pulling Force (kg) | 99 | 104 | 96 | 101 | 98 | 97 | 99 | 87 | 90 | 91 |
| Rubber Coverage Ratio (%) | 95 | 92 | 90 | 88 | 88 | 93 | 90 | 83 | 81 | 93 |
| after 3 weeks Pulling Force (kg) | 97 | 101 | 92 | 93 | 96 | 98 | 99 | 89 | 89 | 90 |
| Rubber Coverage Ratio (%) | 94 | 93 | 90 | 90 | 89 | 90 | 89 | 75 | 71 | 91 |

*4) Cobalt naphthenate used was a product of Dainippon Ink & Chemicals, Inc., having a cobalt content of 10.0%
*5) The determination was impossible because the wire was broken It is apparent from Table 2 that the rubber compositions containing the Bonding promoters A, B, C and G having the metaborate structure of the general formula (I) in Examples 1 to 6 have excellent tensile properties and the wet heat-resistant bondabilities after vulcanization thereof are far superior to those of the composition of Comparative Example 4 containing cobalt naphthenate which is a conventional bonding promoter used widely. Furthermore, it is apparent that they have a lower bondability dependence on conditions of vulcanization than that of the compositions of Comparative Examples 1 to 3 containing orthoborate carboxylate.

Particularly, after the low-temperature vulcanization at 145° C. in Comparative Example 1, the rubber coverage ratio was reduced to 79% due to the deterioration for a long time (3 weeks). After the high-temperature vulcanization at 170° C. in Comparative Examples 2 and 3, the rubber coverage ratio was reduced to 75% or below after the deterioration for a long time (3 weeks).

On the contrary, the rubber coverag ratio in Examples 1 to 6 were at least 89%, which indicates a quite excellent warm water-resistant bondability after vulcanization. Further in any of the initial bondability, the wet heat-resistant bondability after vulcanization and the warm water-resistant bondability after vulcanization of Examples 1 to 6, the rubber coverage ratio was at least 88%, which indicates a remarkably improved bondability of the rubber to steel cords.

What is claimed is:

1. A rubber composition comprising a diene rubber containing a compound of the following general formula (I) incorporated thereinto:

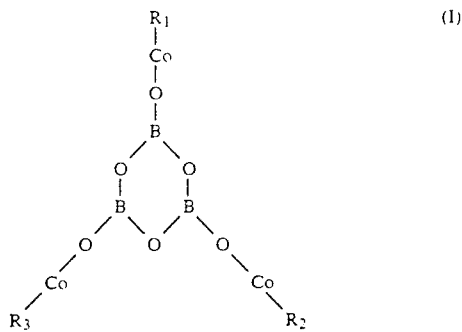

wherein $R_1$, $R_2$ and $R_3$ may be the same or different from one another and each represents a monocarboxylic radical bonded to the adjacent Co atom through the oxygen atom which is adjacent to the carbonyl group in said monocarboxylic radical.

2. A rubber composition according to claim 1, wherein $R_1$, $R_2$ and $R_3$ in the general formula (I) may be the same or different from one another and each represents a radical selected from the group consisting of aliphatic monocarboxylic radicals and alicyclic monocarboxylic radicals.

3. A rubber composition according to claim 1, wherein the aliphatic or alicyclic monocarboxylic radical is at least one member selected from the group consisting of aliphatic monocarboxylic radicals having 8 to 12 carbon atoms and naphthenic radicals having an acid value of 100 to 340.

4. A rubber composition according to claim 3, wherein the aliphatic monocarboxylic radical having 8 to 12 carbon atoms is at least one member selected from the group consisting of 2-ethylhexanoic acid radical, neodecanoic acid radical and lauric acid radical.

5. A rubber composition according to claim 1, wherein the diene rubber is at least one member selected from the group consisting of natural rubber, synthetic polyisoprene rubber, polybutadiene rubber, styrene/butadiene copolymer rubber, ethylene/propylene terpolymer rubber and butyl rubber.

6. A rubber composition according to claim 5, wherein the diene rubber is at least one member selected from the group consisting of natural rubber and synthetic polyisoprene rubber.

7. A rubber composition according to claim 1, wherein the amount of the compound of the general formula (I) is 0.05 to 1.0 part by weight in terms of cobalt element for 100 part by weight of the rubber.

8. A rubber product reinforced with steel cords coated with a rubber composition comprising a diene rubber containing a compound of the following general formula (I) incorporated thereinto:

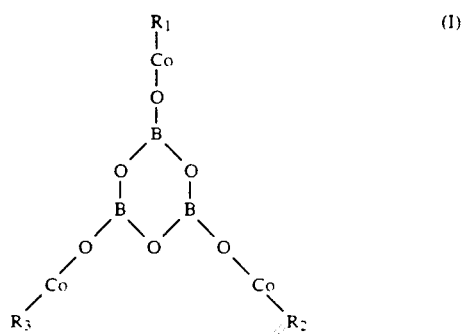

wherein $R_1$, $R_2$ and $R_3$ may be the same or different from one another and each represents a monocarboxylic radical bonded to the adjacent Co atom through the oxygen atom which is adjacent to the carbonyl group in said monocarboxylic radical.

9. A rubber product according to claim 8, wherein $R_1$, $R_2$ and $R_3$ in the general formula (I) may be the same or different from one another and each represents a radical selected from the group consisting of aliphatic monocarboxylic radicals and alicyclic monocarboxylic radicals.

10. A rubber product according to claim 9, wherein $R_1$, the aliphatic or alicyclic monocarboxylic radical is at least one member selected from the group consisting of aliphatic monocarboxylic radicals having 8 to 12 carbon atoms and naphthetic acid radicals having an acid value of 100 to 340.

11. A rubber product according to claim 8, wherein the diene rubber is at least one member selected from the group consisting of natural rubber, synthetic polyisoprene rubber, polybutadiene rubber, styrene/butadiene copolymer rubber, ethylene/propylene terpolymer rubber and butyl rubber.

12. A rubber product according to claim 8, wherein the amount of the compound of the general formula (I) is 0.05 to 1.0 part by weight for 100 parts by weight of the rubber.

13. A rubber product according to claim 8, wherein the steel cords are those plated with at least one metal selected from the group consisting of brass and zinc.

14. A rubber product according to claim 8, which is a pneumatic tire.

15. A rubber product according to claim 8, which is a conveyor belt.

16. A rubber product reinforced with steel cords coated with a rubber composition comprising a diene rubber containing a reaction product of a monocarboxylic acid cobalt salt with a metaboric ester.

17. A rubber product according to claim 16, wherein the monocarboxylic acid cobalt salt is a mixture of at least one of cobalt salts of a carboxylic acid selected from the group consisting of aliphatic monocarboxylic acids having 8 to 12 carbon atoms and naphthenic acids having an acid value of 100 to 340 with at least one of cobalt salts of a monocarboxylic acid selected from the group consisting of aliphatic monocarboxylic acids having 2 to 4 carbon atoms.

18. A rubber product according to claim 16, wherein the steel cords are those plated with at least one metal selected from the group consisting of brass and zinc.

19. A rubber product according to claim 16, which is a pneumatic tire.

* * * * *